United States Patent [19]

Holmqvist et al.

[11] Patent Number: 5,208,539
[45] Date of Patent: May 4, 1993

[54] METHOD FOR DETERMINING ELECTROMAGNETICALLY THE LOCATIONS OF UNDERGROUND ORE DEPOSITS

[75] Inventors: Svante Holmqvist; Robert Pantze, both of Boliden; Stig Strömbergsson, Kåge, all of Sweden

[73] Assignee: Boliden Mineral AB, Boliden, Sweden

[21] Appl. No.: 815,809

[22] Filed: Dec. 30, 1991

[30] Foreign Application Priority Data

Jan. 4, 1991 [SE] Sweden .............................. 9100018

[51] Int. Cl.$^5$ .............................................. G01V 3/10
[52] U.S. Cl. .................................. 324/334; 324/335; 324/339
[58] Field of Search ............................ 324/332–344

[56] References Cited

U.S. PATENT DOCUMENTS 2,919,397 12/1959 Morley ............................... 324/334
4,314,251 2/1982 Raab ............................... 324/343 X

FOREIGN PATENT DOCUMENTS 1467943 3/1977 United Kingdom .
2148012 4/1987 United Kingdom .

OTHER PUBLICATIONS

Pantze, et al, "Borehole Geophysics for Mining and Geotechnical Applications"; Sep. 1989; pp. 79–88.

Primary Examiner—Gerard R. Strecker
Assistant Examiner—Warren S. Edmonds
Attorney, Agent, or Firm—Nils H. Ljungman and Associates

[57] ABSTRACT

A method and apparatus for determining electromagnetically the locations of electrically conductive bodies beneath the surface of the ground, wherein a primary electromagnetic field is generated with the aid of a loop through which a sinusoidal alternating current is passed. The loop is placed at or above the level of the ground beneath which the locations of conductive bodies shall be determined. There are currents generated in the conductive bodies which, in turn, generate a secondary electromagnetic field. The values of the amplitude and phase of the magnetic component of the thus formed total electromagnetic field are measured with the aid of coils mounted inside a probe which is lowered to different depths in a borehole. The values of the primary field phase are measured continuously by at least one reference coil which is placed outside the probe, either above or beneath the surface of the ground, within the propagation area of the primary field. The reference coil is orientated so as to receive at least one component of the magnetic field and the signals obtained form the reference coil, or the result of the processed signals, are transmitted to the receiver on a transmission line.

20 Claims, 1 Drawing Sheet

METHOD FOR DETERMINING ELECTROMAGNETICALLY THE LOCATIONS OF UNDERGROUND ORE DEPOSITS

BACKGROUND OF THE INVENTION

1. Field of the Invention

The present invention relates to a method for detecting the locations of underground electrically conductive bodies in accordance with the preamble of claim 1, said method being particularly useful for prospecting deeply located parts of old mining districts. The invention also relates to apparatus for carrying out the method.

2. Background Information

The last 10 to 15 years have shown an increased interest in the development of a geophysical prospecting technique for detecting the presence of deeply-buried valuable deposits, as a complement to geophysical surface prospecting methods.

Of the underground geophysical prospecting methods proposed, the method which involves the use of electromagnetic borehole probes has found increasing interest. This technique is based on the general principle of passing an alternating current through a loop placed on the ground surface, normally a square loop having a side-size of from 100×100 m up to 1000×1000 m or larger, such as to generate a primary electromagnetic field which propagates underground. The electromagnetic field thus generated induces currents in each conductive body that is located within the propagation area of the primary field. These induced currents in turn generate a secondary electromagnetic field. Methods have been proposed for determining the time decay of an induced secondary field, subsequent to having discontinued the supply of direct current through the ground loop. These methods are referred to generally as "time-domain methods", of which SIROTEM (trademark) originating in Australia is one such method. When practicing these known methods, only that component of the induced secondary field which is parallel with the axis of the borehole at the place where said locations are determined is measured, and consequently no signals are obtained which disclose whether the field direction is perpendicular to the borehole axis or not. The use of a so-called horizontal-field induction coil has also been proposed, these coils being used two-and-two in each probe. One drawback with this methodology, however, is that it is necessary to establish a ground loop which is located symmetrically around the borehole where the locations of valuable deposits are to be determined.

The later development of methods based on electromagnetic alternating fields with sinusoidal time-dependent amplitude (frequency-domain methods) have further improved deep prospecting possibilities. A fundamental feature of these methods is that the field components are measured while maintaining the primary field, wherein the sum of the primary field and the secondary field are measured in different ways. U.S. Pat. No. 2,919,397 (L. W. Morley) teaches an inductive prospecting arrangement which includes a transmitter coil for generating a primary field, a receiver having three coils, an independent quadrating unit for each receiver coil, and a pickup-coil which is physically and electrically isolated from and located at a distance from the receiver coils. A primary field concerned with barren ground or a vacuums is subtracted by the pickup-coil which supplies information concerning the strength of the transmitter signals. Although the arrangement is described solely with regard to prospecting above ground level, e.g. is airborne, it is conceivable that the arrangement could also be used for prospecting underground in a borehole. In this latter case, however, the relatively unsophisticated technique described would probably be unable to subtract a primary field with the pickup coil. GB-B-2148012 (R. W. Cobcroft, AU) thus proposes the use of three linear independent field detecting coils for determining the total, combined, magnetic field in each of three directions, wherein the so-called polarization ellipse formed by vectors in the composite magnetic field is determined at each measuring location. The actual presence of a polarization ellipse indicates the presence of conductive bodies in the immediate vicinity, although the direction to and the distance from the indicated bodies can only be determined very approximately. GB-A 1 467 943 (Bureau de Recherches) teaches a borehole prospecting method based on the use of low-frequency radio waves. This method is based on the decrease in the amplitude of the magnetic field vector as the radio waves propagate down into the ground. The method employs a single-component probe which is directed along the borehole and which registers that component of the sum of the primary and secondary fields which is parallel with the coil, i.e. which is parallel with the borehole axis. The method assumes that the ground is homogenous and isotropic, i.e. has the same resistivity overall and the same properties in all directions. There is no description relating to the calculation of the primary and secondary fields, although the amplitude and phase position of the receiver probe signal are determined, the values obtained being later used to establish the resistivity of the surroundings.

In the 1980s, Boliden developed a borehole measuring method based on a similar technique, referred to as BHEM (borehole-EM), and a surface survey method (EM3). The BHEM-technique is described in more detail in the report entitled "Borehole Geophysics for Mining and Geotechnical Applications" published in Geological Survey of Canada Paper 85-27 (Toronto, 1983). Boliden's method also enables the position of the underground conductive bodies indicated by the method to be determined, at least in the case of valuable deposits located at reasonable depths beneath the ground surface.

The Boliden BHEM-technique is primarily based on the principle of placing a large cable loop on the surface of the ground and subsequently sending through the cable a sinusoidal alternating current having a frequency within the range of some few Hz to several Khz. As indicated in the aforegoing, this current regenerates a primary electromagnetic field which interacts with conductive bodies, particularly the magnetic component of the field which induces currents in the conductive bodies. These secondary currents generate a secondary magnetic field which is superimposed on the primary field. Receiver coils of a three-component system are placed and accurately orientated at several different positions on or above the ground surface (EM3) or are mounted inside a borehole probe and positioned in a borehole, beneath the surface of the ground. The magnetic component of the electromagnetic field comprising both the primary and the secondary electromagnetic fields, this combined field being referred to as the total electromagnetic field, is determined at each location in which a receiver coil system has been placed. Several frequencies can be transmitted, received and recorded simultaneously, or in close sequence. The amplitude and the phase of the received field is measured and recorded in a receiver unit, to which the receiver coils are connected.

Information concerning the primary field, i.e. the field generated by the cable loop, is transmitted to the receiver unit in the form of high-frequency radio waves, thereby enabling both the amplitude of the primary field and the phase difference between the primary field and the total field measured in each receiver coil to be determined. In this case, the borehole probe measures the EM-field parallel with the borehole and measures the horizontal field at right angles to the hole, and also measures a third component which is perpendicular to the other two components. The probe fitted with said three coils is provided with a cradle which is journalled at two points and which ensures that the two coils which do not measure the field component that lies parallel with the borehole will always be positioned correctly, because of the gravitational forces acting thereon. This is particularly important with regard to measuring accuracy. The three components form a right-orientated coordinate system. Data measured in this way is recorded and processed, by first calculating the primary field at each selected measuring location. A model based on a simplified theoretical basis, wherein both amplitude and phase are determined for each of the three components (X, Y, Z) corresponded by the three coils, has been developed for calculating the configuration or appearance of the primary field at different depths beneath the surface of the ground. This theoretical basis is determined for the known bedrock or base rock at the sampling site in the absence of conducting bodies in the vicinity. The primary field data is then calculated and recorded, whereafter this data can be subtracted from corresponding data for the total field, such as to obtain the secondary field data. This calculation is preferably effected by dividing each space (three-dimensional) component (X, Y, Z), the amplitude and phase of which are known, into two phase components, the real component, which is in phase with the vectors of the local primary field, and the imaginary component, which is 90 degrees out of phase with the vectors of the local primary field. When, as in the general case, the three space components in the local primary field do not have mutually the same phase position, the real component and the imaginary component of all three space components of the primary field will normally be separated from zero. Thus, the vectorial calculation involves subtracting the primary field from the measured field for each of the six components, there being obtained a residual field in six components, namely real and imaginary components for each of the X, Y and Z directions. This is equivalent to knowing the direction, amplitude and phase of the secondary field.

The manner in which these calculations are made is described and exemplified in more detail in the article "Borehole Geophysics for Mining and Geotechnical Applications" mentioned in the introduction.

Since the secondary field is therefore known, this knowledge can be used to calculate the distribution of those currents which generate the secondary field. These currents flow within those parts of the ground which are more conductive than the surroundings and which, under favourable conditions and more specifically under conditions of high conductivity contrasts, low general conductivity and a homogenous primary field, are concentrated at the edges of the superior conductors. The boundaries of a target for further prospective drilling, for the purpose of further investigating the possible presence of a valuable deposit, are determined in this way.

In addition to assuming mathematical models for calculating the magnetic field at any selected location in the homogenous bedrock or ground, the BHEM-method also assumes that it is possible to measure, determine and record instantaneously the phase of such a field as it exists in the proximity of the probe measuring process in progress. Since the function of the phase reference is particularly important for distinguishing the secondary field from the primary field, and also for defining the real and imaginary components of the secondary field, it is necessary to use a correctly indicating and stable phase reference. The phase reference, which according to the aforegoing is transmitted from the transmitter to the receiver in the form of radio waves, actually involves recording the precise time of the zero crossing of the frequency used. It is also theoretically possible, of course, to determine and record this time point with the aid of particularly accurate clocks with precise timing, each clock sending signals to the transmitters and receivers. In practice, however, this would require the use of clocks (atomic clocks) of such an advanced nature as to render the solution prohibitive for use with the BHEM-method.

Thus, at present, the BHEM-method can only be used when the transmission of signals from transmitter to receiver is not disturbed by intermediate rock formations, both in the horizontal and the vertical directions. If the transmitter/receiver are located underneath a conductive earth-covering, it is also possible that the desired anticipatability will be lost, which may also occur when an electrically conductive rock formation lies over the crystalline rock formation to be investigated. When prospecting in a borehole down a mine, it is often difficult to draw a cable from a surface-located radio receiver down through the borehole. The provision of such a cable is necessary, however, because the frequencies of radio waves are so high that the radio waves only penetrate a short distance down into the ground.

OBJECT OF THE INVENTION

There is therefore a need for an improved BHEM-method which is not encumbered with the drawbacks and limitations of the existing method.

SUMMARY OF THE INVENTION

To this end, there is proposed in accordance with the invention a method and an arrangement for electromagnetically determining the locations of conductive bodies beneath the ground surface, said method and arrangement being characterized by the characteristic features set forth in the relevant claims. Thus, when practicing the invention, the primary magnetic field is measured continuously with the aid of a reference coil which is placed outside the borehole probe, either on or beneath the surface of the ground, within the propagation area of the primary field, and preferably outside the secondary field. The coil is oriented so as to receive at least one component of the primary magnetic field, wherein the signals obtained from the reference coil, or the results obtained when processing said signals, are transmitted on each receiver line for registration.

It is particularly preferred to place both receiver and reference coil underground. This application of the invention is particularly advantageous when the depth investigations are carried out from existing underground cavities, such as mines, for instance. Hitherto, it has not been possible to carry out low-frequency EM-investigations with both space components and phase components with the aid of earlier known geophysical methods. Although it is possible, of course, to position either the receiver or reference coil underground when carrying out underground investigations, the least possible disturbances occur in practice during those measuring procedures that are carried out with the reference coil placed as close as possible to the receiver, although still outside any secondary field that might occur. The reference coil and receiver may, alternatively, both be placed above ground level, for instance when borehole measuring processes are effected from ground surface and when the region in which prospecting is carried out is pronouncedly undulating or mountainous. In cases such as these, the radio transmission of reference signals is liable to be disturbed or highly restricted, for instance in the case of intervening rock formations or when the measuring process is carried out in deep dales or troughs.

Fiberoptic cables may be used advantageously to achieve the least possible disturbances in the transmission of signals to the receiver.

In order to achieve the best possible result, the reference coil is preferably oriented to a position in which it will take-up the largest possible amount of the primary field.

The frequency of the reference coil is preferably tuned to the loop transmission frequency. It is important to avoid disturbances from other sources which give rise to magnetic fields, such as power networks of 50 and 60 Hz. The coil must be arranged so that it is stable both physically and electrically, such as to obtain the same amplitude reference and phase reference irrespective of fluctuations in ambient temperature, humidity and in the voltage of the electronics power supply source. It is also essential that the coil is arranged such as to prevent the occurrence of vibrations with frequencies in the vicinity of the transmitter loop frequency.

BRIEF DESCRIPTION OF THE DRAWING

The invention will now be described in more detail with reference to the accompanying drawing, the single FIGURE of which illustrates diagrammatically a preferred embodiment of the invention as applied in an underground space.

DESCRIPTION OF THE PREFERRED EMBODIMENT

Figure 1:
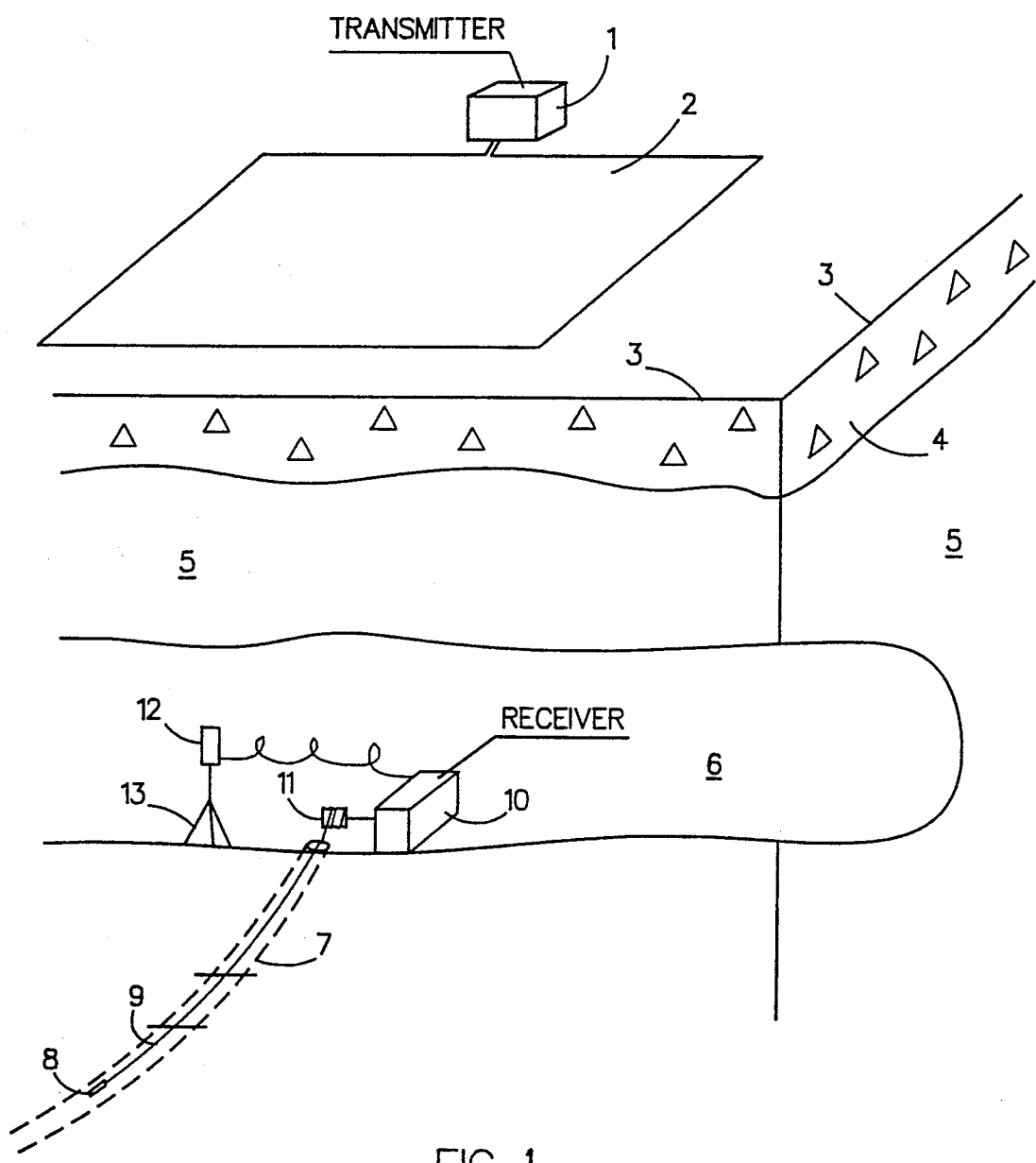

Shown in the FIGURE is a transmitter 1 which delivers an alternating current of 4 amperes to a loop 2. The transmitter 1 will normally have a maximum power output of 1000 W and preferably operates at two different frequencies, for instance a frequency of 200 Hz and a frequency of 2000 Hz. The geometric size of the loop 2 is from 100×100 m to 1000×1000 m. Located beneath the ground surface 3 is an earth layer 4 and beneath that a rock formation 5 which includes a rock cavity 6, for instance a drift or gallery. A borehole 7 extends vertically downwards in the rock formation 5, from the rock cavity 6. Positioned in the borehole 7 is a probe 8 equipped with three measuring coils, which are connected by a cable 9 to a receiver 10 and which can be raised and lowered in the borehole 7 by winding and unwinding the cable 9 onto and from a reel 11. Signals are sent from the probe 8 through the cable 9 to the receiver 10, which also receives signals from a reference coil 12 placed in the vicinity of the receiver 10 in the rock cavity 6 on a vibration-damping frame 13. Information relating to the phase of the primary field is continuously received by the receiver 10 from the reference coil 12.

One of the most important advantages afforded by the present invention is that borehole assays can be made in old underground mines, e.g. deep prospecting with the intention of ascertaining whether or not mineral deposits are to be found beneath the mine. Since the primary field is measured continuously by a reference coil arranged in accordance with the invention, e.g. beneath the surface of the ground in existing mine passageways, the problem of needing to draw cables from the surface down into the mine is avoided. On the other hand, it is often a simple matter to draw a cable along the same level in a mine. A further advantage afforded by the invention is that measurements can be taken with the probe in several different boreholes which depart from one and the same level, while maintaining the reference measurement. This implies, among other things, the occurrence of a minimum of error sources that can be referred to the reference measurement. Signals from the reference coil of the inventive arrangement are used to enable the relative phase of the received signal components to be determined at each point along the borehole and also to enable an absolute determination to be made of the phase position, by placing the reference coil in a position where the coil will not be disturbed by the conductor, such absolute determination of said phase position being otherwise particularly complicated. This provides a good basis on which to calculate the primary field and the subsequent calculation of the secondary field and conductor edges.

What is claimed is:

1. Method for electromagnetically determining the position of an underground conductive body, said method comprising the steps of:
   providing a loop for generating a primary electromagnetic field and means for generating a current in the loop, the primary electromagnetic field for being propagated underground to interact with an underground conductive body to provide a secondary electromagnetic field;
   positioning the loop, at a surface of terrain, generally above an area in which the position of an underground conductive body is to be determined, to define a propagation area of the primary field;
   positioning the means for generating a current in the loop adjacent the loop;
   providing a borehole within the propagation area;
   providing probe means for being disposed in the borehole and for receiving at least a portion of a total electromagnetic field, the total electromagnetic field comprising at least a portion of the primary electromagnetic field and at least a portion of the secondary electromagnetic field;
   providing receiver means for receiving signals from the probe means;
   providing means for transmitting measurement information from the probe means to the receiver means;

providing reference coil means, separate from the receiver means, for receiving at least a portion of the primary electromagnetic field;

providing means for transmitting measurement information from the reference coil means to the receiver means;

said receiver means comprising means for determining the secondary electromagnetic field from the measurement information from the probe means and from the measurement information from the reference coil means;

positioning both the reference coil means and the receiver means underground and remotely from the loop;

disposing the probe means in the borehole;

generating a current in the loop to create the primary electromagnetic field;

propagating the primary electromagnetic field underground, in the propagation area, to interact with an underground conductive body to provide the secondary electromagnetic field;

measuring the total electromagnetic field comprising the primary electromagnetic field and the secondary electromagnetic field;

measuring the primary electromagnetic field;

transmitting measurement information of the total electromagnetic field from the probe means to the receiver means;

transmitting measurement information of the primary electromagnetic field from the reference coil means to the receiver means; and determining the secondary electromagnetic field to generate information about the location of the conductive body.

2. The method according to claim 1, further comprising:
positioning the receiver means in proximity to the reference coil means.

3. The method according to claim 2, further comprising:
providing the probe means with three separate coils, each of the three separate coils being configured to receive a portion of the primary electromagnetic field in each of three linearly independent directions.

4. The method according to claim 3, wherein a sinusoidal alternating current is generated in the loop.

5. The method according to claim 4, wherein the primary electromagnetic field is measured by measuring the phase of the primary electromagnetic field.

6. The method according to claim 5, wherein the total electromagnetic field is measured by measuring the amplitude and phase of the magnetic component of the total electromagnetic field in three linear, independent directions.

7. The method according to claim 6, wherein the secondary electromagnetic field is determined by calculating the phase difference between the primary electromagnetic field and the total electromagnetic field to determine three real and three imaginary components of the secondary electromagnetic field.

8. The method according to claim 7, wherein said step of positioning the reference coil means includes orienting the reference coil means to receive at least one component of the primary electromagnetic field.

9. The method according to claim 8, wherein the reference coil means and the receiver means are positioned in a cavernous area underground.

10. The method according to claim 9, further comprising:
providing a first transmission line for transmitting measurement information of the total electromagnetic field from the probe means to the receiver means;

providing a second transmission line for transmitting measurement information of the primary electromagnetic field from the reference coil means to the receiver means;

the primary electromagnetic field being measured continuously by means of the reference coil means;

providing fiberoptic cable means for the second transmission line;

the reference coil means being oriented to receive as great a portion of the primary electromagnetic field as possible;

providing means for tuning a frequency of the reference coil means;

tuning the frequency of the reference coil means to a frequency of the loop;

the reference coil being positioned outside of the secondary electromagnetic field;

configuring the reference coil means to produce a phase reference of the primary electromagnetic field regardless of temperature, humidity and possible vibrations;

providing fiberoptic cable means for the first transmission line;

the reference coil means being positioned on a vibration-damping frame; and the borehole being provided by boring the borehole downwardly from the cavernous area.

11. Method for electromagnetically determining the position of an underground conductive body in an area, such as in a mountainous or undulating area, where the transmission of radio waves is prone to be disturbed, said method comprising the steps of:
providing a loop for generating a primary electromagnetic field and means for generating a current in the loop, the primary electromagnetic field for being propagated underground to interact with an underground conductive body to provide a secondary electromagnetic field;

positioning the loop in an area in which the position of an underground conductive body is to be determined, to define a propagation area of the primary field;

positioning the means for generating a current in the loop adjacent to the loop;

providing a borehole within the propagation area;

providing probe means for being disposed in the borehole and for receiving at least a portion of a total electromagnetic field, the total electromagnetic field comprising at least a portion of the primary electromagnetic field and at least a portion of the secondary electromagnetic field;

providing receiver means for receiving signals from the probe means;

providing means for transmitting measurement information from the probe means to the receiver means;

providing reference coil means, separate from the receiver means, for receiving at least a portion of the primary electromagnetic field;

providing means for transmitting measurement information from the reference coil means to the receiver means;

said receiver means comprising means for determining the secondary electromagnetic field from the measurement information from the probe means and from the measurement information from the reference coil means;
positioning both the reference coil means and the receiver means remotely from the loop and in an area wherein there is mountainous or undulating terrain between the loop and the combination of the reference coil means and the receiver means;
disposing the probe means in the borehole;
generating a current in the loop to create the primary electromagnetic field;
propagating the primary electromagnetic field underground, in the propagation area, to interact with an underground conductive body to provide the secondary electromagnetic field;
measuring the total electromagnetic field comprising the primary electromagnetic field and the secondary electromagnetic field;
measuring the primary electromagnetic field;
transmitting measurement information of the total electromagnetic field from the probe means to the receiver means;
transmitting measurement information of the primary electromagnetic field from the reference coil means to the receiver means; and
determining the secondary electromagnetic field to generate information about the location of the conductive body.

12. The method according to claim 11, further comprising:
positioning the receiver means in proximity to the reference coil means.

13. The method according to claim 12, further comprising:
providing the probe means with three separate coils, each of the three separate coils being configured to receive a portion of the primary electromagnetic field in each of three linearly independent directions.

14. The method according to claim 13, wherein a sinusoidal alternating current is generated in the loop.

15. The method according to claim 14, wherein the primary electromagnetic field is measured by measuring the phase of the primary electromagnetic field.

16. The method according to claim 15, wherein the total electromagnetic field is measured by measuring the amplitude and phase of the magnetic component of the total electromagnetic field in three linear, independent directions.

17. The method according to claim 16, wherein the secondary electromagnetic field is determined by calculating the phase difference between the primary electromagnetic field and the total electromagnetic field to determined three real and three imaginary components of the secondary electromagnetic field.

18. Apparatus for electromagnetically determining the position of an underground conductive body, said apparatus comprising:
a loop for generating a primary electromagnetic field and means for generating a current in said loop, the primary electromagnetic field for being propagated underground to interact with an underground conductive body to provide a secondary electromagnetic field;
said loop being configured for being positioned at a surface of terrain, generally above an area in which the position of an underground conductive body is to be determined, to define a propagation area of the primary field;
said means for generating a current in said loop, for being positioned adjacent said loop;
probe means for being disposed in a borehole being provided within the propagation area;
said probe means for receiving at least a portion of a total electromagnetic field which total electromagnetic field comprises at least a portion of the primary electromagnetic field and at least a portion of the secondary electromagnetic field;
receiver means for receiving signals from said probe means;
means for transmitting measurement information of the total electromagnetic field from said probe means to said receiver means;
reference coil means, separate from said receiver means, for receiving at least a portion of the primary electromagnetic field;
means for transmitting measurement information of the primary magnetic field from said reference coil means to said receiver means;
said receiver means comprising means for determining the secondary electromagnetic field from the measurement information from said probe means and from the measurement information from said reference coil means; and
both said reference coil means and said receiver means being configured for being positioned underground and remotely from said loop.

19. The apparatus according to claim 18, further comprising:
said receiver means being configured for being positioned in proximity to said reference coil means;
said probe means being provided with three separate coils, each of said three separate coils for receiving a portion of the primary electromagnetic field in each of three linearly independent directions;
said means for generating, a current in said loop, comprising means for generating a sinusoidal alternating current in said loop;
means for measuring the primary electromagnetic field by measuring the phase of the primary electromagnetic field;
means for measuring the total electromagnetic field by measuring the amplitude and phase of the magnetic component of the total electromagnetic field in three linear, independent directions;
means for determining the secondary electromagnetic field by calculating the phase difference between the primary electromagnetic field and the total electromagnetic field to determine three real and three imaginary components of the secondary electromagnetic field;
said reference coil means being configured for being oriented to receive at least one component of the primary electromagnetic field;
said reference coil means and said receiver means both being configured for being positioned in a cavernous area underground;
a first transmission line for transmitting measurement information of the total electromagnetic field from said probe means to said receiver means;
a second transmission line for transmitting measurement information of the primary electromagnetic field from said reference coil means to said receiver means;

said reference coil means for continuously measuring the primary electromagnetic field;

said second transmission line comprising fiberoptic cable means;

said reference coil means for being oriented to receive as great a portion of the primary electromagnetic field as possible;

means for tuning a frequency of said reference coil means;

said tuning means comprising means for tuning the frequency of said reference coil means to a frequency of said loop;

said reference coil for being positioned outside of the secondary electromagnetic field;

said reference coil means for producing a phase reference of the primary electromagnetic field regardless of temperature, humidity and vibrations;

said first transmission line comprising fiberoptic cable means;

a vibration damping frame, wherein said reference coil means is for being positioned on said vibration-damping frame; and the borehole being bored downwardly from the cavernous area.

20. The method according to claim 17, further comprising:

said step of positioning the reference coil means including orienting the reference coil means to receive at least one component of the primary electromagnetic field;

providing a first transmission line for transmitting measurement information of the total electromagnetic field from the probe means to the receiver means;

providing a second transmission line for transmitting measurement information of the primary electromagnetic field from the reference coil means to the receiver means;

the primary electromagnetic field being measured continuously by means of the reference coil means;

providing fiberoptic cable means for the second transmission line;

the reference coil means being oriented to receive as great a portion of the primary electromagnetic field as possible;

providing means for tuning a frequency of the reference coil means;

tuning the frequency of the reference coil means to a frequency of the loop;

the reference coil being positioned outside of the secondary electromagnetic field;

configuring the reference coil to produce a phase reference of the primary electromagnetic field regardless of temperature, humidity and vibrations;

providing fiberoptic cable means for the first transmission line; and the reference coil means being positioned on a vibration-damping frame.

* * * * *